United States Patent [19]

Izadpanah

[11] Patent Number: 5,050,167
[45] Date of Patent: Sep. 17, 1991

[54] TIMING EXTRACTION IN MULTIPLEXED MULTICHANNEL HIGH SPEED FIBER OPTIC TRANSMISSION SYSTEM

[75] Inventor: Hossein Izadpanah, Randolph, N.J.

[73] Assignee: Bell Communications Research, Inc., Livingston, N.J.

[21] Appl. No.: 392,118

[22] Filed: Aug. 10, 1989

[51] Int. Cl.$^5$ .................. H04J 3/04; H04J 3/06
[52] U.S. Cl. ..................... 370/112; 370/108
[58] Field of Search ............ 370/112, 108, 105.1, 370/105.3, 100.1, 107, 105.5, 10, 8, 9, 84; 375/106, 113, 118, 119, 23, 22

[56] References Cited

U.S. PATENT DOCUMENTS

| | | | |
|---|---|---|---|
| 3,727,061 | 4/1973 | Dworkin | 370/8 |
| 3,931,473 | 1/1976 | Ferris, Jr. | 370/107 |
| 4,967,410 | 10/1990 | Takase et al. | 370/108 |

OTHER PUBLICATIONS

"Digital PCM Bit Synchronizer and Detector," A. E. Moghazi et al. IEEE Trans. Comm., Com-28, pp. 1197-1203, Aug. 1980.
"2 Gbit/s Timing Recovery Circuit Using Dielectric Resonator Filter," D. J. Millicker et al. Elect. Lett., 23, pp. 738-739, Jul. 1987.
"New Proposal for Multigigabit/s Clock Recovery IC Based on a Standard Silicon Bipolar Technology," D. Wang et al. Electr. Lett., 23, pp. 454-456, Apr. 1987.
"New Method of Data Regeneration for Multigigabit/s Lightwave Systems," K. Runge et al. Digest, OFC'89 Paper #WN2, Houston, Tex. 1989.
"1.13-Gbit/s Lightwave Transmission System," K. Y. Maxham et al. J. Lightwave Techn., Lt-5, No. 10, pp. 1510-1517, Oct. 1987.
"Multigigabit Per Second Short Optical Pulse Transmitter Experiment," H. Izadpanah et al. Conf. Digest CLEO '88, Anaheim, Calif. pp. 128-129.
"Optical TDM For Very High Bit-Rate Transmission," R. S. Tucker et al. J. Lightwave Techn., LT-6, pp. 1737-1749, 1988.
"Injection Locking of Microwave Solid-State Oscillators," K. Kurokaw, Proc. IEEE, 61, pp. 1386-1410, Oct. 1973.
"Direct Timing Extraction in a Modified-Manchester Coded Picosecond Optical Pulse Fibre Optic Transmission System," H. Izadpanah, Electr. Lett., 24 pp. 1151-1152, Sep. 1988.

Primary Examiner—Douglas W. Olms
Assistant Examiner—Wellington Chin
Attorney, Agent, or Firm—Stephen M. Gurey

[57] ABSTRACT

Recovery of the timing signal is obtained directly at the receiver of the time-division multiplexed transmission system in accordance with the present invention. At the transmitter, multiplexing (203) of plural return-to-zero format (RZ) channels (201-1-201-N) is delay controlled (202) so that the position of each pulse of each channel within each time slot is offset from the beginning or the end of the time slot by a predetermined fixed delay, the position of the data bits in pairs of adjacent time slots being mirror-imaged with respect to their common time point. The power density spectrum of the resultant signal has an "enchanced" discrete component at the clock frequency and a dip in the continuous spectrum. At the receiver a large amplitude phase-synchronized clock signal is derived from this discrete component in one single step by an injection-locking technique (704).

13 Claims, 5 Drawing Sheets

TIMING EXTRACTION IN MULTIPLEXED MULTICHANNEL HIGH SPEED FIBER OPTIC TRANSMISSION SYSTEM

BACKGROUND OF THE INVENTION

This invention relates to multiplexed multi-channel high speed optical transmission systems, and more particularly to a technique for directly extracting and deriving a large amplitude timing signal from the received signal in such systems.

In very high speed multi-Gbit/s fiber optic transmission systems onto which plural data channels are time-division multiplexed, the usual first step to access the individual data channels at the receiving end is to recover the timing signal from the received signal for purposes of establishing synchronization, for separating the plural data channels, and for detecting the received data bits.

For the widely used pseudorandom non-return-to-zero (NRZ) signal format, the data spectrum is a broadband continuum which does not contain sufficient energy at the clock frequency. In order to generate a timing signal at the receiving end from such a data stream two major steps are required. First, nonlinear signal processing steps such as transition enchancement (differentiation/squaring, multiplication), and/or other nonlinear treatment of the received signal are necessary to generate a relatively weak "reference" clock signal. (See for example, "Digital PCM Bit Synchronizer and Detector", by A. E. Moghazi, G. Maral, and A. Blanchard, *IEEE Trans. Comm.*, COM-28, pp. 1197–1203, August 1980.) In a second stage, filtering (for example, SAW [surface acoustic wave]filtering), amplification, phase comparison (for example, phase lock loop [PLL]), and hardlimiting are performed to condition the clock before it can be applied to a decision circuit. (See for example: "2 Gbit/s timing recovery circuit using dielectric resonator", by D. J. Millicker and R. D. Standley, 1987, *Elect. Lett*,. 23, pp. 738–739; "New proposal for Multigigabit/s Clock Recovery IC Based on Standard Bipolar Technology", by D. Wang and U. Langmann, 1987, Electr. Lett., 23, pp. 454–56; and Digest, OFC '89, by K. Runge, et al, paper # WN2, Houston, Tex., 1989.) Several methods of generating discrete clock components from the received signal are well developed and commercial high-speed clock recovery circuits are available for frequencies up to 2.4 Gbit/s rates and have been implemented in off-the-shelf Gbit/s transmission systems.

For very high-speed and multi-Gbit/s systems, the transmitted signal is constructed by time division multiplexing, in either the electrical or the optical domain, incoming lower speed channels. The signal on each incoming lower speed channel and the multiplexed signal generally has a return-to-zero (RZ) signal format. In the RZ signal format, each time-slot contains either a pulse of finite width (less than the width of the time-slot), representing a binary ONE, or no pulse, representing a binary ZERO. Multiplexing with the RZ format is the common approach in multi-Gbit/s communication systems to increase the network throughput and in fiber optic systems to take more efficient advantage of the vast fiber bandwidth. (See for example, "1.13-Gbit/s. Lightwave Transmission System" by K. Y. Maxham, J. M. Dugan, M. A. McDonald, and C. R. Hogge, *J. Lightwave Techn.*, Lt-5, No. 10, pp. 1510–1517, Oct. 1987; "Multi-Gbit/s Picosecond Optical Pulse Transmitter Experiment" by H. Izadpanah, and A. Albanese, 1988, *Conf. Digest* CLEO '88, Anaheim, CA, pp. 128–129; and "Optical TDM for Very High Bit-Rate Transmission", by R. S. Tucker, G. Eisenstein, and S. K. Korotky, 1988, *J. Lightwave Techn*,. LT-6, pp. 1737–1749.) With a pseudorandom RZ signal format, the multiplexed data stream spectrum contains some energy at the desired clock frequency. It is, however, fully embedded in the continuous part of the frequency spectrum of the data signal. Processing stages are thus required to "clean up" (i.e., rejection of the power in the continuous spectrum outside the immediate region surrounding the clock frequency) and to amplify the reference clock for the second stage of processing.

An object of the present invention is to modify, at the transmitter, the spectrum of the multiplexed pseudorandom RZ signal so as to enhance the discrete clock component while simultaneously depressing the continuous component at that frequency to allow the enhanced clock component to be used, at the receiver, as the "reference" timing signal. The aforenoted preprocessing stages in the receiver needed to produce a reference clock signal can then be eliminated.

A further object of the present invention is to directly obtain, at the receiver, from this discrete clock component, the necessary large amplitude clock signal without the conventional multipart second stage processing circuitry needed in the aforenoted prior art timing recovery circuits.

A feature of the present invention is that the signal processing steps for clock recovery at the receiver can be performed in a fewer number of stages leading to a reduction of the receiver design complexity and a concomitant reduction in overall receiver cost.

SUMMARY OF THE INVENTION

In the transmission system of the present invention, time-division multiplexing in the electrical or optical domains of plural pseudorandom RZ format data channels is controlled in such a manner that the position of the data pulse of each channel within the time slot assigned to each data channel is not uniform from time slot to time slot but is set unevenly in a predetermined pattern. In particular, the position of the pulse of each channel within each time slot is offset from the beginning or the end of the time slot by a predetermined fixed delay, the position of the data bits in pairs of adjacent time slots being mirror-imaged with respect to the common time point of the pair. Thus for an N channel system (N being even), pulses in channels $1, 3 \ldots, N-1$ are offset by a fixed delay of $t_d$ from the beginning of their respective time slots, and pulses in channels $2, 4, \ldots, N$ are offset by the same fixed delay $t_d$ from the end of their respective time slots. As a result of this controlled multiplexing, the frequency spectrum of the resultant interleaved data stream will thereby have an "enhanced" discrete component at the clock frequency surrounded by a spectral "dip" or "hole" in the continuum. By properly selecting $t_d$ relative to the length of the time slot, the discrete power at the desired clock frequency can be optimized. In accordance with the present invention, the final, jitter-free large amplitude clock signal is derived at the receiver from the discrete frequency component at the clock frequency in one single step by an injection-locking technique.

Advantageously, the present invention obviates the need for preprocessing circuitry at the receiver to derive the clock component. Furthermore, the complexity of the second stage processing circuitry is substantially reduced. Receiver design is thus improved with a reduction in overall cost.

DETAILED DESCRIPTION

Figure 1:
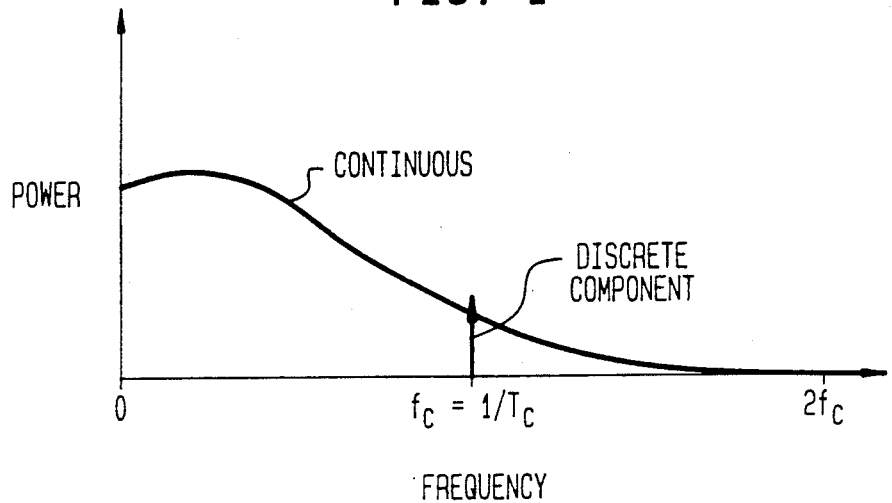
FIG. 1 shows the power spectral density of a conventional return-to-zero data signal.

With reference to FIG. 1, the power spectral density of a conventional return-to-zero data signal is shown. As can be noted, the spectrum contains a discrete energy component at the clock frequency $f_c = 1/T_c$ where $T_c$ is the clock period. This discrete component, however, is fully embedded in the continuous part of the data spectrum and cannot recovered without preprocessing of the signal at the receiver.

Figure 2:
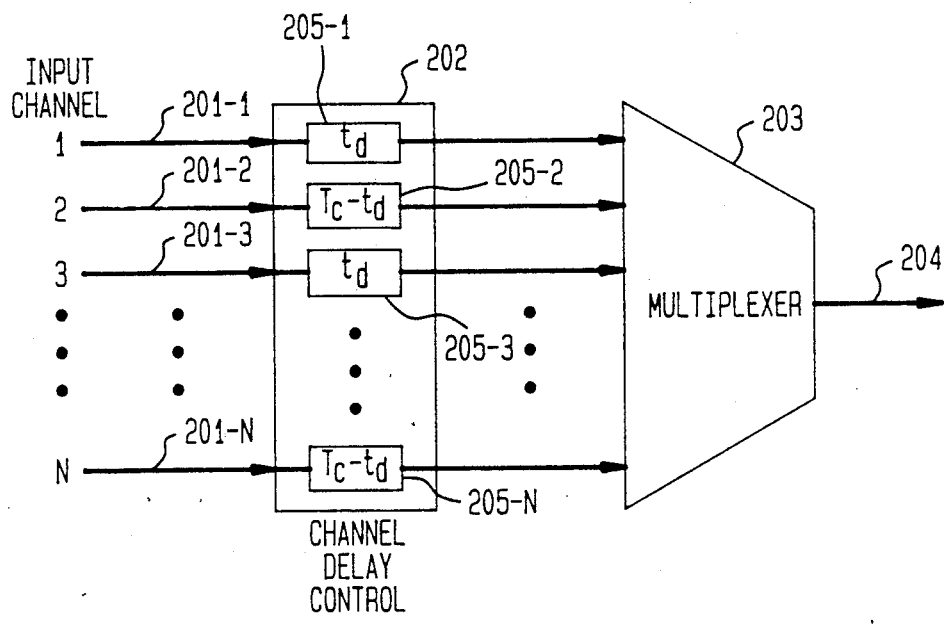
FIG. 2 is shows the multiplexing arrangement of the present invention in the transmitter of an N-channel time-division-multiplexed system.

In accordance with the present invention, multiplexing (in the optical or electrical domains) at the transmitter is controlled in such a manner to enhance the desired discrete component of the power spectrum and to depress the continuous component at the clock frequency. FIG. 2 shows the controlled multiplexing arrangement at the transmitter of an N-channel time-division-multiplexed system. Data signals in the RZ signal format are present on each of the N input channels 201-1-201-N. Each of the N input channels 201-1-201-N is connected through a channel delay control 202 to a multiplexer 203. Multiplexer 203 time division multiplexes in a standard manner one time slot from each of the N channels, the time slots being at the a clock period $T_c$ and the multiplexer having a multiplexer cycle time of $T_m$ where $T_m = N \times T_C$. The outptu 204 of multiplexer 203 contains the multiplexed data stream.

Figure 3:
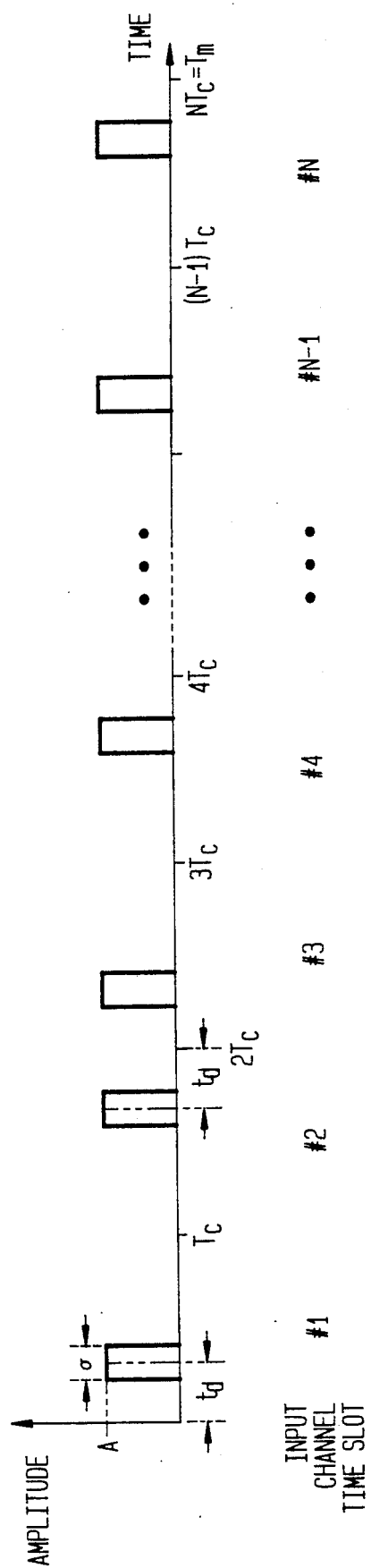
FIG. 3 shows a channel timing diagram of the output of the multiplexing arrangement in FIG. 2.

With reference also to FIG. 3, channel delay control 202 offsets the center of the position of the channel signal of the pulse within each time slot by a fixed time, $t_d$, from either the beginning or end of each clock time slot. In particular, the center of each channel pulse with an amplitude A and pulse width $\sigma$ ($\sigma$ being much shorter than the clock period $T_c$) is delayed in time slots 1, 3, 5, 7, ..., N−1 (for N even) by a time $t_d$ from the beginning of the time slot. Each channel pulse is delayed by the same $t_d$ from the end of the time slot in time slots 2, 4, 6, ..., N. Thus in each pair of time slots, 1 & 2, 3 & 4, ..., N−1 & N, the position of the data bit forms a mirror image at the pair's common time point.

With reference back to FIG. 2, this is readily accomplished by channel delay control 202, which includes N delay elements 205-1-205-N and which are connected to input channels 201-1-201-N, respectively. Delay elements 205-1, 205-3, ..., 205-(N−1) (for N even) have a delay of $t_d$ and delay elements 205-2, ... 205-N have a delay of $T_c - t_d$.

Figure 4:
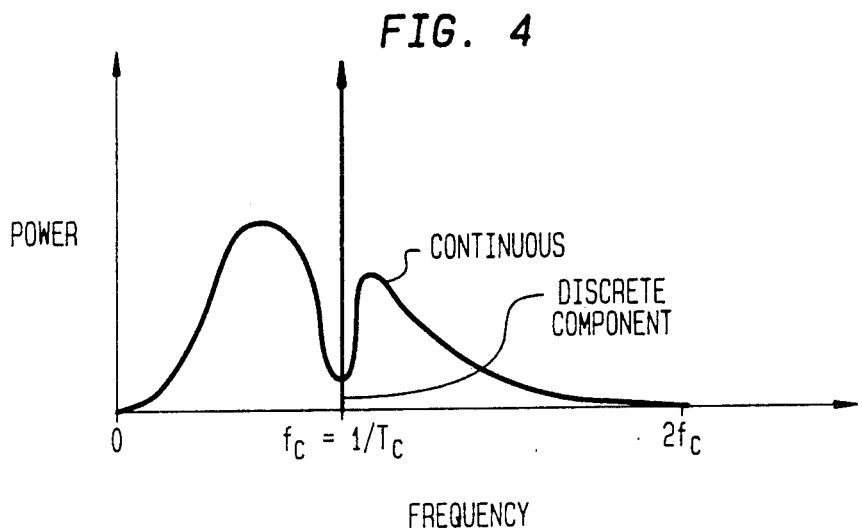
FIG. 4 shows the power spectral density of the output of the multiplexing arrangement in FIG. 2.

It can be shown that the power spectrum of multiplexed random data sequences will have an enhanced discrete component at the desired clock frequency $f_c = 1/T_c$ and lowers the power content in the dc and low frequency part of the data spectrum, as is shown in FIG. 4. By performing a spectral analysis of the controlled multiplexing scheme, the discrete power component can be optimized by selection of the adjustable parameters $t_d$ and the pulse width, $\sigma$. For the sake of analysis, the optimization of the controlled multiplexing scheme for two data channels is presented hereinbelow. The analysis can then be applied to a higher number of channels. It is assumed that each channel signal is a random data sequence consisting of uncorrelated identically distributed ZERO and ONE symbols. It is also assumed that the transmitter maps the information of channel one into the signal $s_1(t)$ delayed $t_d$ from the beginning of the time slot, and channel two information into the signal $s_2(t)$ delayed $t_d$ away from the end of the bit time slot (i.e. at the position $T - t_d$), respectively. The corresponding Fourier transform components $S_1(f)$ and $S_2(f)$ are written as:

$$S_1(f) = A\sigma \sin c(f\sigma) e^{-j2\pi f t_d} \quad (1)$$

$$S_2(f) = A\sigma \sin c(f\sigma) e^{-j2\pi f(T-t_d)} \quad (2)$$

The Power Spectral Density of the multiplexed signal received at the receiving end of the channel is given by:

$$S(f) = \frac{1}{T^2} \sum_{n=-\infty}^{\infty} A^2 \sigma^2 \text{sinc}^2\left(\sigma \frac{n}{T}\right) \cos^2\left[2\pi \frac{n}{T}\left(\frac{T}{2} - \delta\right)\right] \delta\left(f - \frac{n}{T}\right) + \frac{A^2 \sigma^2}{T} \text{sinc}^2(\sigma f) \sin^2\left[2\pi f\left(\frac{T}{2} - \delta\right)\right] \quad (3)$$

In order to assess how much energy there is at the clock frequency, the following ration is computed:

$$R_1 = \frac{\text{Power in } 1^{st} \text{ harmonic}}{\text{Total Power}} \quad (4)$$

By using the first and second terms in the summation of expression (1) yields $$R_1 = \frac{2\sin^2(\pi\alpha) \cos^2(\pi[1 - 2\beta])}{\alpha \pi^2} \quad (5)$$

where $\alpha = \frac{\sigma}{T}$, $\beta = \frac{t_d}{T}$.

Figure 5:
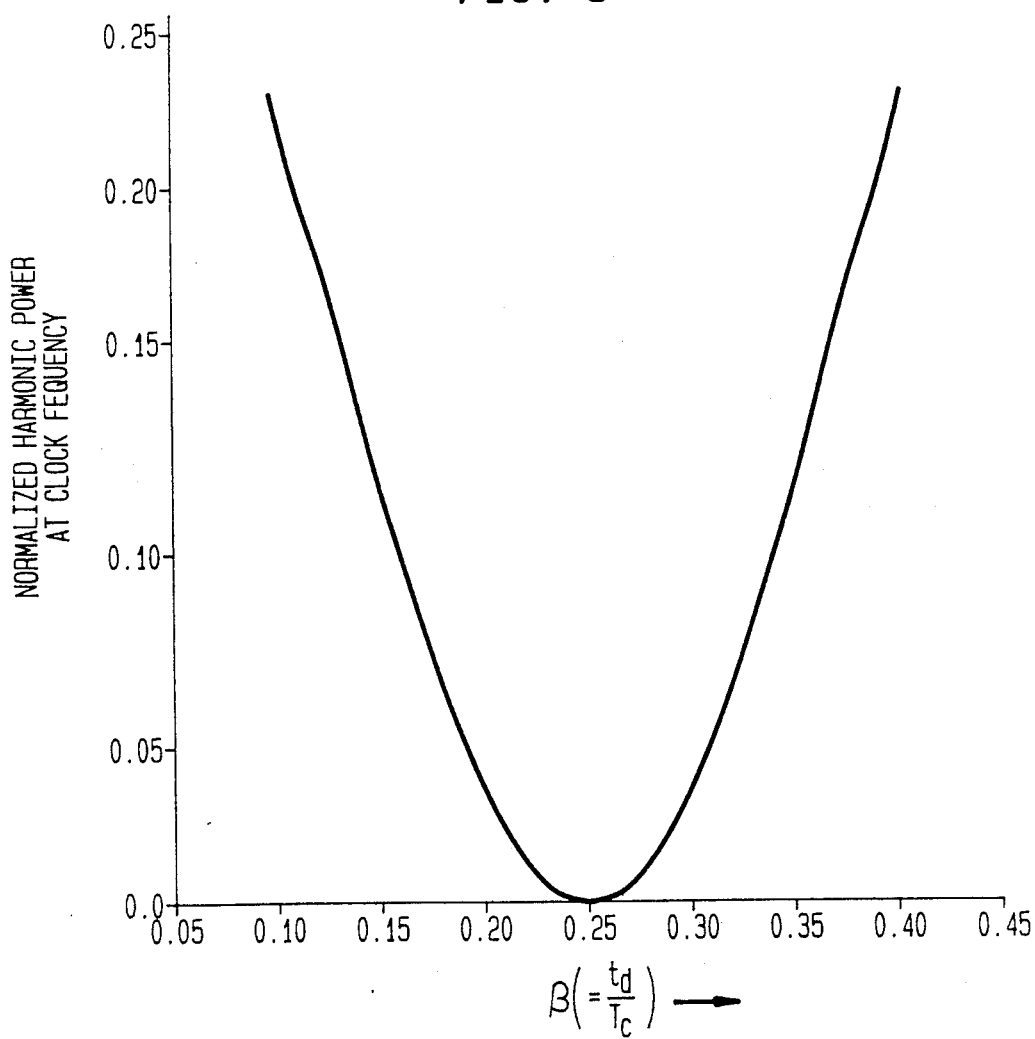
FIG. 5 shows the variation of the power of the discrete component at the clock frequency as a function of the normalized timing delay, $t_d$.

The computed pair $(\alpha, \beta)$ that maximizes the clock power are $\alpha \approx 0.185$ and $\beta \approx 0.092$. FIG. 5 shows the variation of $R_1$ as a function of $\beta$ when $\alpha$ is set equal to 0.185. It can be noted that at the optimal value, 23% of the total power is in the fundamental clock signal.

Figure 6:
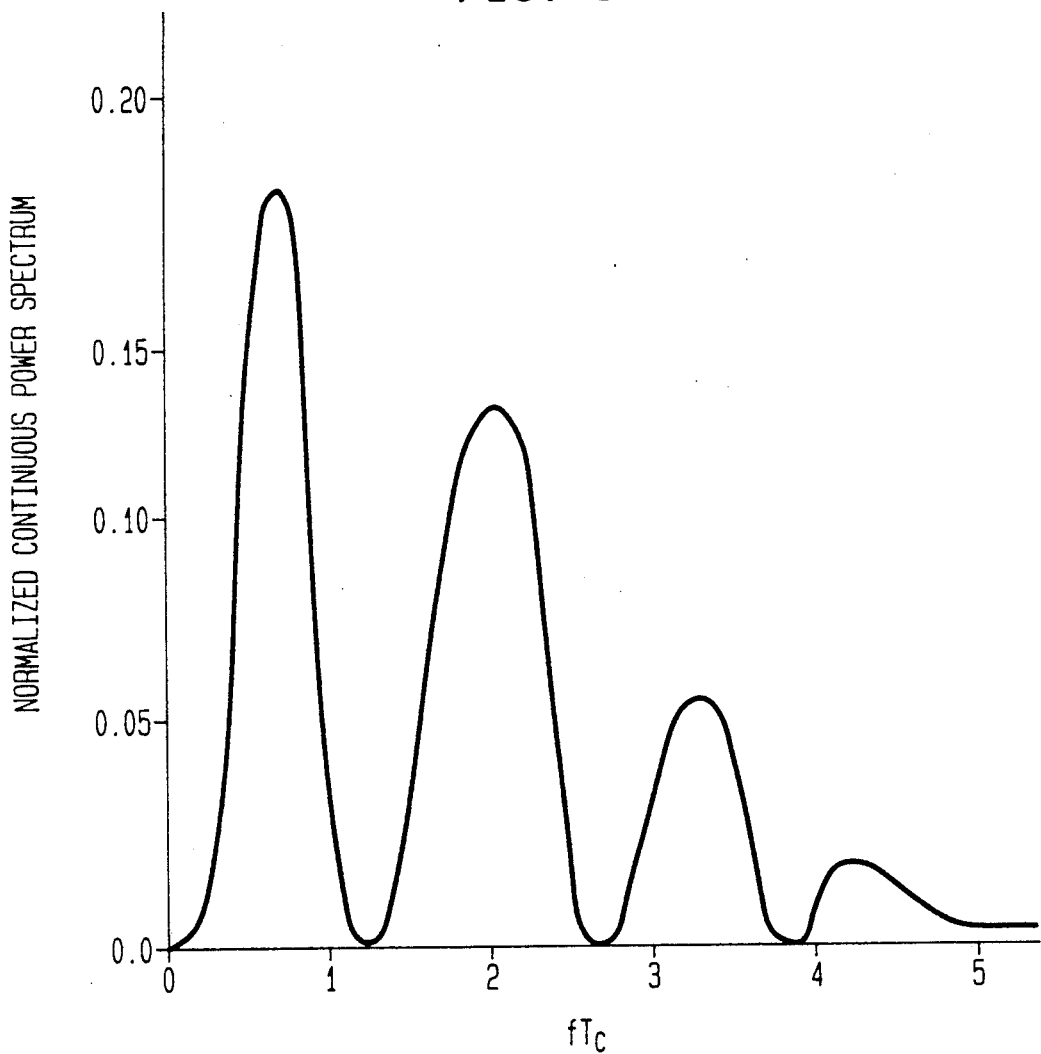
FIG. 6 shows the normalized continuous power spectral density of the received signal for the optimum delay.

FIG. 6 shows the normalized continuous spectrum for the optimal values of $\alpha$ and $\beta$ noted above. At the clock frequency (i.e. $fT_c = 1$), the continuous spectrum has a "dip" resulting in a low jitter clock extraction. Since the discrete clock component (as the reference clock) now exists in the received power spectrum, the first stage of clock processing is no longer required. Rather, the second stage of processing can be performed by using a physically realizable narrow bandpass filter followed by amplification. In accordance with the present invention, the received reference clock is injected into an electronic oscillator the output of which will be the final clock signal. The injection locking mechanism is a well known phenomenon and is widely used for synchronization (see, for example, "Injection Locking of Microwave Solid-State Oscillators", by K. Kurokaw, 1973, *Proc. Ieee*, 61, pp. 1386–1410). As in any oscillator, the oscillation builds up from the noise and parasitic signals. For the injection-locked case, when the injected signal frequency is near the center frequency of the oscillator resonant circuit, the onset of oscillation will be triggered by injection rather than noise. In this way, the oscillator frequency and phase are coupled to the exact frequency of the injected signal and, simultaneously, phase-synchronized by injection. The injection locking employed herein is equivalent to a narrow bandpass filtering of the received data spectrum (within the oscillator resonance range), while at the same time, providing large signal amplification (with a typical gain of $\simeq 100$). Thus, in one step, a low jitter, large amplitude, in-phase clock is obtained by injection-locking without requiring additional signal processing (see, for example, "Direct timing extraction in a modified-Manchester coded picosecond optical pulse fiber optic transmission system" by the inventor herein, 1988, *Electrn. Lett.*, 24, No. 18, pp. 1151–1152).

Figure 7:
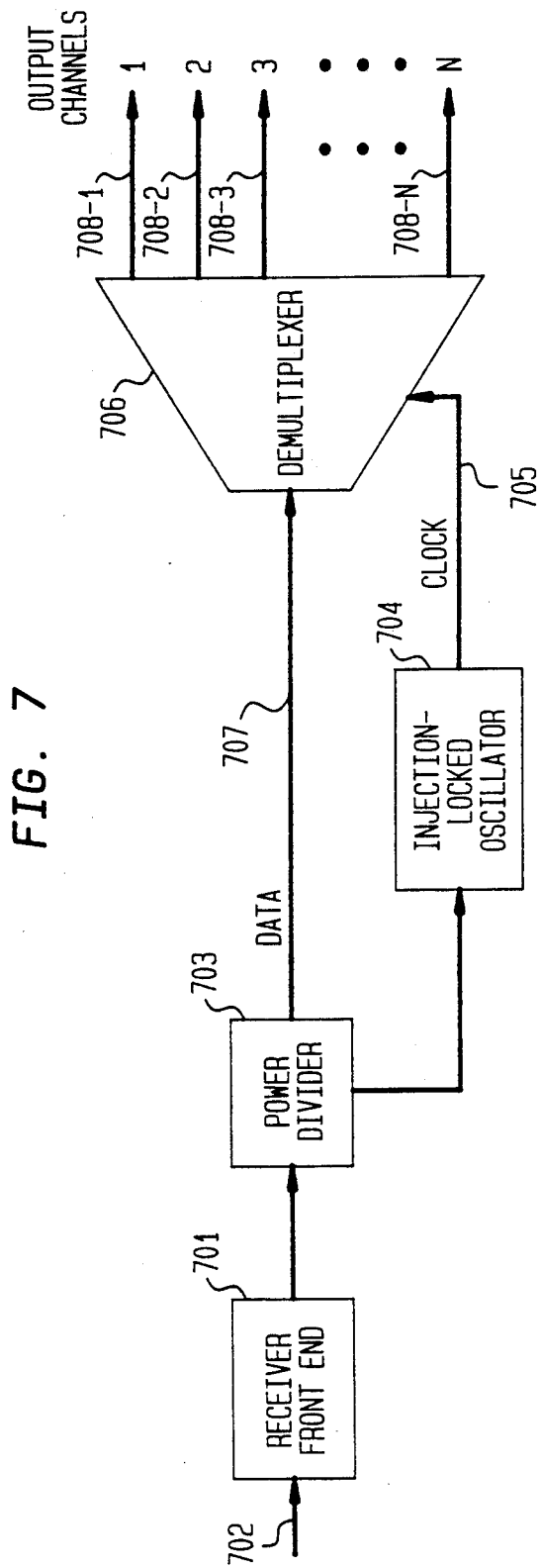
FIG. 7 shows the circuit arrangement at the receiver for clock recovery by injection-locking.

With reference to FIG. 7, the circuit for recovering the timing signal from the received signal is shown. A receiver front end circuit 701 accepts the received signal on input 702. In the optical domain, receiver front end circuit 701 accepts the input from an optical fiber and the receiver front end includes a photodetector for converting the optical signal to an electrical signal, and a low noise wideband amplifier. In the electrical domain, receiver front end circuit 701 accepts the input via an antenna and includes a low noise wideband amplifier. As a result of the controlled multiplexing, the receiver can be ac coupled due to the absence of a dc component and the low power content at low frequencies. The resultant electrical output of circuit 701 is divided by power divider into two portions. A first portion is applied to the injection-locked oscillator 704 which generates on oscillator output 705, as detailed hereinabove, the large amplitude phase-synchronized clock. This clock signal is applied to demultiplexer 706 together with the second output 707 of power divider 703 which contains the received multiplexed data signal. The clock signal causes the multiplexed channels in the data signal on 707 to be separated and directed onto the individual N output channels 708-1–708-N.

Other embodiments of the receiver circuitry which recovers the large amplitude clock signal and demultiplexes the received channel can also be implemented. For example, in the optical domain, an incoming optical signal that has not been converted to an electrical signal can be used to directly trigger an oscillator (e.g. a phototransistor oscillator) which by injection-locking generates a large electrical clock signal. This electrical clock signal is then used for demultiplexing, in the electrical domain, the received signal after is has been converted from optical to electrical domains.

Alternatively, for directly processing in the optical domain, the incoming optical signal can be applied to an optical demultiplexer (such as a $LiNiO_3$ switch) which is controlled by an electrical clock signal generated by the optical injection-locked oscillator, as described above. The optical demultiplexer then separates the input optical signal into plural optical output channels.

The above-described embodiments are illustrative of the principles of the present invention. Other embodiments could be devised by those skilled in the art without departing from the spirit and scope of the present invention.

What is claimed is:

1. In the transmitter of a time-division multiplexed system which multiplexes at a clock frequency data pulses from plural input channels onto an output data stream, each output data pulse being within a time slot, multiplex control means for controlling the position of the data pulse for each channel within the time slot associated with that channel comprising means for offsetting the position of the data pulse by a predetermined delay from the beginning of the each time slot associated with selected ones of the plural input channels, and means for offsetting the position of the data pulse by said predetermined delay from the end of each time slot associated with the other of the plural input channels, wherein the power density spectrum of the multiplexed data stream has an enhanced discrete component at said clock frequency and the continuous portion of said spectrum has a dip in the region of said clock frequency.

2. In the transmitter of claim 1, said multiplex control means further comprising means for offsetting the position of the data pulse in each time slot so that the pulse position in pairs of adjacent time slots form a mirror-image with respect to the common time point of each pair.

3. In the transmitter of claim 2, the pulse width of each data pulse being approximately 18.5 percent of the length of the time slot and said predetermined time delay being approximately 9.2 percent of the length of the time slot.

4. A time-division multiplexed transmission system for transmitting between a transmitter and a receiver in an output data pulse stream at a clock frequency multiplexed data pulses from plural input channels, each output data pulse being within a time slot in the output data stream comprising:

at the transmitter, multiplex control means for controlling the position of the data pulse for each channel within the time slot associated with that channel in the output pulse stream comprising means for offsetting the position of the data pulse by a predetermined delay from the beginning of the each time slot associated with selected ones of the plural input channels, and means for offsetting the position of the data pulse by said predetermined delay from the end of each time slot associated with the other of the plural input channels, and at the receiver, timing recovery means for deriving a large amplitude timing signal at said clock frequency comprising an injectionlocked oscillator and means for applying a portion of the received multiplexed data stream to said injection-locked oscillator, said oscillator generating a large amplitude timing signal phase-synchronized with the received data stream.

5. At the transmitter of the transmission system in accordance with claim 4, said multiplex control means further comprising means for offsetting the position of the data pulse in each time slot so that the pulse position in pairs of adjacent time slots form a mirror-image with respect to the common time point of each pair.

6. The transmission system of claim 5 wherein the pulse width of each data pulse is approximately 18.5 percent of the length of the time slot and said predetermined time delay is approximately 9.2 percent of the length of the time slot.

7. A timing recovery circuit for the receiver of a time-division multiplexed transmission system which receives at a clock frequency a multiplexed data pulse stream from plural channels, each data pulse being within a time slot in the data stream, the power spectrum of the data stream having an enchanced discrete frequency component at said clock frequency and a dip in the continuous spectrum in the region of said clock frequency, said timing recovery circuit comprising an injection-locked oscillator, and means for applying a portion of the received multiplexed data stream to said injection-locked oscillator, said oscillator generating a large amplitude time signal phase aligned with the received data stream.

8. A transmitter for a time-division multiplexed transmission system comprising:
input means for receiving the data pulse streams from plural input channels;
a multiplexing means for multiplexing onto an output pulse data stream at a clock frequency the data pulses from said plural input channels, each data pulse in said output pulse stream being within a time slot; and
multiplex control means connecting said input means and said multiplexing means for adjusting the position the data pulse within each of the time slots in the output pulse stream comprising means for offsetting the position of the data pulse by a predetermined delay from the beginning of each time slot associated with selected ones of the plural input channels, and means for offsetting the position of the data pulse by said predetermined delay from the end of each time slot associated with the other of the predetermined plural input channels.

9. The transmitter in accordance with claim 8 wherein said multiplex control means further comprises means for offsetting the position of the data pulse in each time slot so that the pulse position in pairs of adjacent time slots form a mirror-image with respect to the common time point of each pair.

10. A method of deriving a timing signal in a time-division multiplexed transmission system which transmits between a transmitter and a receiver in a data pulse stream at a clock frequency multiplexed data pulses from plural input channels, each output data pulse being within a time slot in the output data stream, comprising the steps of:
controlling the multiplexing of the plural input channels at the transmitter so the power spectrum of the multiplexed data stream has an enhanced discrete component at the clock frequency and a dip in the continuous spectrum in the region of the clock frequency; and
directly deriving the timing signal at the receiver from the enhanced discrete component in the spectrum of the received multiplexed data stream.

11. The method of claim 10 wherein the step of controlling the multiplexing comprises the step of:
offsetting, in the multiplexed data stream, the position of the data pulse by a predetermined delay from the beginning of each time slot associated with selected ones of the plural input channels and offsetting the position of the data pulse by said predetermined delay from the end of each time slot associated with the other of the plural input channels.

12. The method of claim 11 wherein the step of offsetting comprises the step of:
offsetting the position of the data pulse in each time slot so that the pulse position in pairs of adjacent time slots form a mirror-image with respect to the common time point of each pair.

13. The method of claim 10 wherein the step of directly deriving the timing signal comprises the step of:
applying the received multiplexed data stream to an oscillator for injection-locking.

* * * * *